United States Patent Office 3,060,202
Patented Oct. 23, 1962

3,060,202
3-OXYGENATED 20-HYDROXY-18,20-CYCLO-PREGNANES
Nien-Chu C. Yang, Chicago, Ill., assignor to G. D. Searle & Co., Chicago, Ill., a corporation of Delaware
No Drawing. Filed Mar. 1, 1960, Ser. No. 12,006
2 Claims. (Cl. 260—397.4)

The present invention relates to a new group of 3-oxygenated 20-hydroxy-18,20-cyclopregnanes and derivatives thereof, and to their preparation from 3-oxygenated pregnan-20-ones by means of irradiation with light. Typically this novel method can be used to produce compounds expressed by the structural formula

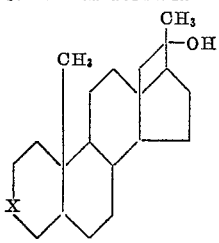

wherein X is a member of the class consisting of CHOH, CHO(CO-lower alkyl), and $C(OCH_3)_2$ and their derivatives possessing a 5,6-double bond. These compounds are susceptible of conversion to other 20-hydroxy-18,20-cyclo steroids by processes which do not involve destruction of the cyclobutanol system. Thus, the ketal grouping of 3,3-dimethoxy-18,20-cyclopregnan-20-ol is converted to a carbonyl group by treatment with dilute acetic acid.

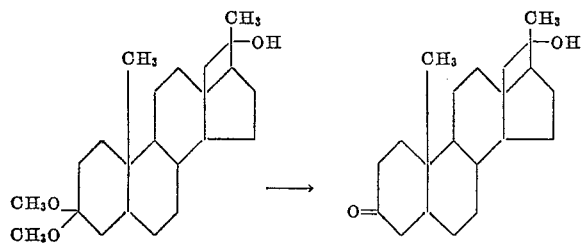

3β-20-dihydroxy-18,20-cyclo-5-pregnene is oxidized under Oppenauer conditions to 20-hydroxy-18,20-cyclo-4-pregnen-3-one.

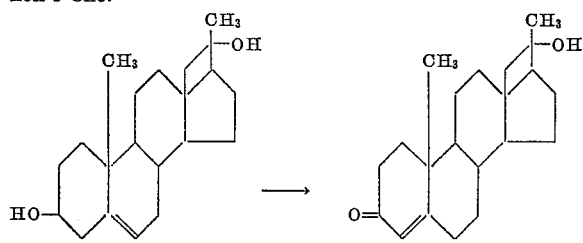

The 18,20-cyclo-20-hydroxy steroids of this invention possess anti-estrone and anti-aldosterone activity as well as local anesthetic properties.

The 3-oxygenated 20-hydroxy-18,20-cyclopregnanes of this invention can be prepared by irradiating 20-keto steroids of the formula

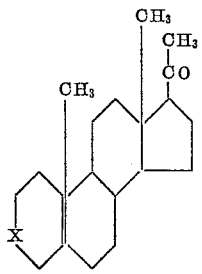

wherein X has the meaning hereinbefore assigned, in solvents such as the lower alkanols with ultraviolet rays, preferably those of a quartz immersion irradiator. The reaction is advantageously carried out under a nitrogen atmosphere. Preferred solvents are alcohols such as methanol and ethanol, either absolute or containing water. The formation of the 18,20-cyclo steroid system represents a simple, readily accessible, synthetic route to a group of compounds otherwise difficult to prepare. The reaction is general for steroids which have trans fusion of the C and D rings and an equatorial acetyl group at $C_{17}$.

The invention will be further illustrated by the following examples which are to be considered as illustrative only and not limiting the invention in spirit or in scope. It will be apparent to those skilled in the art that many modifications, both of materials and methods, may be practiced without departing from the invention. In these examples quantities of materials are given in parts by weight and temperatures are in degrees centigrade.

*Example 1*

A solution of 2.4 parts of 3,3-dimethoxypregnan-20-one in 100 parts of anhydrous methanol is irradiated under nitrogen at 10° C. for about 30 to 34 hours. At the end of this time the absorption of the solution due to the carbonyl band is reduced to about ⅓ of its original value. The solvent is removed under reduced pressure and the residue is taken up in petroleum ether and allowed to stand for 24 hours. The colorless needles (isomer I) of 3,3-dimethoxy-18,20-cyclopregnan-20-ol are removed by filtration, and the supernatant liquid is applied to a chromatography column containing neutral alumina. The column is developed with petroleum ether and petroleum ether containing increasing amounts of benzene. Upon elution with a 1:1 mixture of benzene in petroleum ether, there is obtained the second isomer of 3,3-dimethoxy-18,20-cyclopregnan-20-ol melting at about 111–116° C. An additional amount of isomer I can be isolated from the pure benzene eluate. Upon recrystallization from methanol, isomer I is found to melt at 166° C. Isomer II can be hydrolyzed to the corresponding keto alcohol by treatment with dilute acetic acid and purified by recrystallization from aqueous ethanol. The 18,20-cyclo-20-hydroxypregnan-3-one thus produced has a melting point of about 174° C.

*Example 2*

A solution of 1 part of 3β-acetoxy-5-pregnen-20-one in 80 parts of absolute ethanol is irradiated as described in the preceding example. The solvent is removed under reduced pressure and the residue is applied to a chromatography column containing neutral alumina. The column is developed with petroleum ether and petroleum ether containing increasing amounts of benzene. Upon elution with a 1:4 mixture of benzene in petroleum ether and recrystallization of the product from cyclohexane, there is obtained 3β-acetoxy-20-hydroxy-18,20-cyclo-5-pregnene melting at about 139–140° C. Substitution of 1.1 parts of 3β-propionoxy-5-pregnen-20-one in the foregoing procedure yields 3β-propionoxy-20-hydroxy-18,20-cyclo-5-pregnene.

*Example 3*

A solution of 1 part of 3β-hydroxy-5-pregnen-20-one in 80 parts of 95% ethanol is irradiated under the same conditions as described in Example 1. The solvent is removed under reduced pressure and the residue is triturated with chloroform. Upon recrystallization of the resulting crystals from a mixture of ethyl acetate and ethanol, there is obtained 3β-20-dihydroxy-18,20-cyclo-5-pregnene melting at about 235° C. with decomposition.

Evaporation of the chloroform mother liquor yields a light yellow oil. The oil is dissolved in benzene and chromatographed on 28 parts of neutral alumina. Elution with benzene-dichloromethane (9:1, 3:1) yields a second isomer II melting at about 191–192°.

*Example 4*

A solution of 1 part of 3β,20-dihydroxy-18,20-cyclo-5-pregnene (isomer I of the preceding example) in 10 parts of cyclohexanone and 36 parts of toluene is prepared, and from this solution 4 parts of toluene are distilled. A solution of 0.56 part of aluminum isopropoxide in 8 parts of toluene is added slowly to the remaining mixture, and 4 parts of toluene are distilled from the resultant mixture over 30 minutes. The remaining mixture is steam distilled until the distillate becomes clear. The residue is treated with 8 parts of the saturated solution of potassium sodium tartarate and extracted 3 times with 10 parts of chloroform. The combined extracts are washed with water and dried; the chloroform is distilled at diminished pressure. The residue is recrystallized from methanol to give 18,20-cyclo-20-hydroxy-4-pregnen-3-one melting at 204–205° C.

*Example 5*

A sample of 3β,20-dihydroxy-18,20-cyclo-5-pregnene (isomer II of Example 3) treated as in the preceding example gives 18,20-cyclo-20-hydroxy-4-pregnen-3-one, the second isomer of the product of the preceding example.

What is claimed is:
1. 18,20-cyclo-20-hydroxypregnan-3-one.
2. 3,3-dimethoxy-18,20-cyclopregnan-20-ol.

No references cited.